United States Patent
Yoshizue et al.

(10) Patent No.: US 10,418,867 B2
(45) Date of Patent: Sep. 17, 2019

(54) SWITCHED RELUCTANCE MOTOR

(71) Applicant: TOYOTA JIDOSHA KABUSHIKI KAISHA, Toyota-shi, Aichi-ken (JP)

(72) Inventors: Kensuke Yoshizue, Susono (JP);
Kazuya Arakawa, Fujinomiya (JP);
Junichi Deguchi, Susono (JP);
Masahide Uemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 15/315,483

(22) PCT Filed: Jun. 9, 2015

(86) PCT No.: PCT/IB2015/000882
§ 371 (c)(1),
(2) Date: Dec. 1, 2016

(87) PCT Pub. No.: WO2015/193715
PCT Pub. Date: Dec. 23, 2015

(65) Prior Publication Data
US 2017/0126078 A1    May 4, 2017

(30) Foreign Application Priority Data
Jun. 17, 2014    (JP) ................................. 2014-124806

(51) Int. Cl.
*H02K 1/18*      (2006.01)
*H02K 19/10*     (2006.01)

(52) U.S. Cl.
CPC ............. *H02K 1/18* (2013.01); *H02K 19/103* (2013.01)

(58) Field of Classification Search
CPC ........... H02K 5/24; H02K 1/18; H02K 19/103
USPC ........................................................ 310/51
See application file for complete search history.

(56) References Cited

U.S. PATENT DOCUMENTS

| | | | |
|---|---|---|---|
| 4,503,347 A * | 3/1985 | Bergman | H02K 11/25 310/260 |
| 5,334,897 A * | 8/1994 | Ineson | H02K 5/08 310/401 |
| 7,812,485 B2 * | 10/2010 | Bi | H02K 1/30 310/216.121 |

(Continued)

FOREIGN PATENT DOCUMENTS

| | | |
|---|---|---|
| CN | 1246217 A | 3/2000 |
| CN | 103988402 A | 8/2014 |
| EP | 1320173 A2 | 6/2003 |

(Continued)

*Primary Examiner* — Emily P Pham
*Assistant Examiner* — Monica Mata
(74) *Attorney, Agent, or Firm* — Oliff PLC

(57) ABSTRACT

A switched reluctance motor include: a stator; a case in which the stator is accommodated; a rotor disposed inward of the stator in the radial direction of the switched reluctance motor; and a holding member fixed to the case. The holding member is configured to hold the stator with the stator spaced apart from an inner peripheral surface of the case. The holding member includes a holding portion and a fixed portion. The holding portion is configured to hold the stator from the outside in the radial direction. The holding portion is spaced apart from the inner peripheral surface of the case. The fixed portion is fixed to the case.

7 Claims, 4 Drawing Sheets

(56) References Cited

U.S. PATENT DOCUMENTS

2016/0043681 A1    2/2016  Deguchi et al.

FOREIGN PATENT DOCUMENTS

| | | | | |
|---|---|---|---|---|
| JP | 2000-134849 A | | 5/2000 | |
| JP | 2006211806 A | * | 8/2006 | ............ F16C 35/067 |
| JP | 2010-048775 A | | 3/2010 | |
| JP | 2010-114951 A | | 5/2010 | |
| JP | 2013-090383 A | | 5/2013 | |
| JP | 2016-001973 A | | 1/2016 | |
| JP | 2016-010293 A | | 1/2016 | |
| JP | 2016-019423 A | | 2/2016 | |
| JP | 2016-039763 A | | 3/2016 | |
| WO | 98/034324 A1 | | 8/1998 | |
| WO | 2013/087255 A2 | | 6/2013 | |

* cited by examiner

SWITCHED RELUCTANCE MOTOR

BACKGROUND OF THE INVENTION

1. Field of the Invention

The invention relates to a switched reluctance motor.

2. Description of Related Art

There are conventional reluctance motors. For example, Japanese Patent Application Publication No. 2000-134849 (JP 2000-134849 A) describes a technology pertaining to a reluctance motor that includes a generally-tubular stator having a plurality of salient poles, a rotor having a plurality of salient poles, and a plurality of coils respectively wound around the salient poles of the stator. The reluctance motor described in JP 2000-134849 A further includes a plurality of connection members. The connection members connect the adjacent salient poles of the stator to each other. The connection members have a Young's modulus higher than that of the stator. The connection members are members prepared separately from the stator. Salient-pole-side end portions of each connection member are fixed to the salient poles of the stator, which face the salient-pole-side end portions of the connection member. In the reluctance motor in JP 2000-134849 A, the stator is press-fitted in a housing.

For example, when a reluctance motor is mounted in a vehicle, the vibrations and noise generated by a stator are transmitted toward a vehicle body through a case. When the stator is press-fitted to the inner peripheral surface of the case, the vibrations and noise are transmitted directly to the inner peripheral surface of the case from the outer peripheral surface of the stator. As a result, the drivability may be reduced due to the vibrations and noise that are transmitted from the stator toward the vehicle body through the case. Reduction in the vibrations and noise that are transmitted from the stator to the case makes it possible to reduce the vibrations and noise that are transmitted to the outside of the motor.

SUMMARY OF THE INVENTION

The invention provides a switched reluctance motor configured to reduce the vibrations and noise that are transmitted from a stator to a case.

A switched reluctance motor according to an aspect of the invention includes: a stator; a case in which the stator is accommodated; a rotor disposed inward of the stator in the radial direction of the switched reluctance motor; and a holding member fixed to the case. The holding member is configured to hold the stator with the stator spaced apart from the inner peripheral surface of the case. The holding member includes a holding portion and a fixed portion. The holding portion is configured to hold the stator from the outside in the radial direction. The holding portion is spaced apart from the inner peripheral surface of the case. The fixed portion is fixed to the case.

With the switched reluctance motor according to the aspect of the invention, the vibrations and noise that are transmitted from the stator to the case are reduced due to the configuration in which the stator and the holding portion are spaced apart from the inner peripheral surface of the case.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a switched reluctance motor according to an embodiment of the invention will be described in detail with reference to the accompanying drawings. Note that the invention is not limited to the embodiment described below. Further, the components described in the following embodiment may be replaced with components that a person skilled in the art can easily conceive of, or may be replaced with components that are substantially the same as those in the following embodiment.

Figure 1:
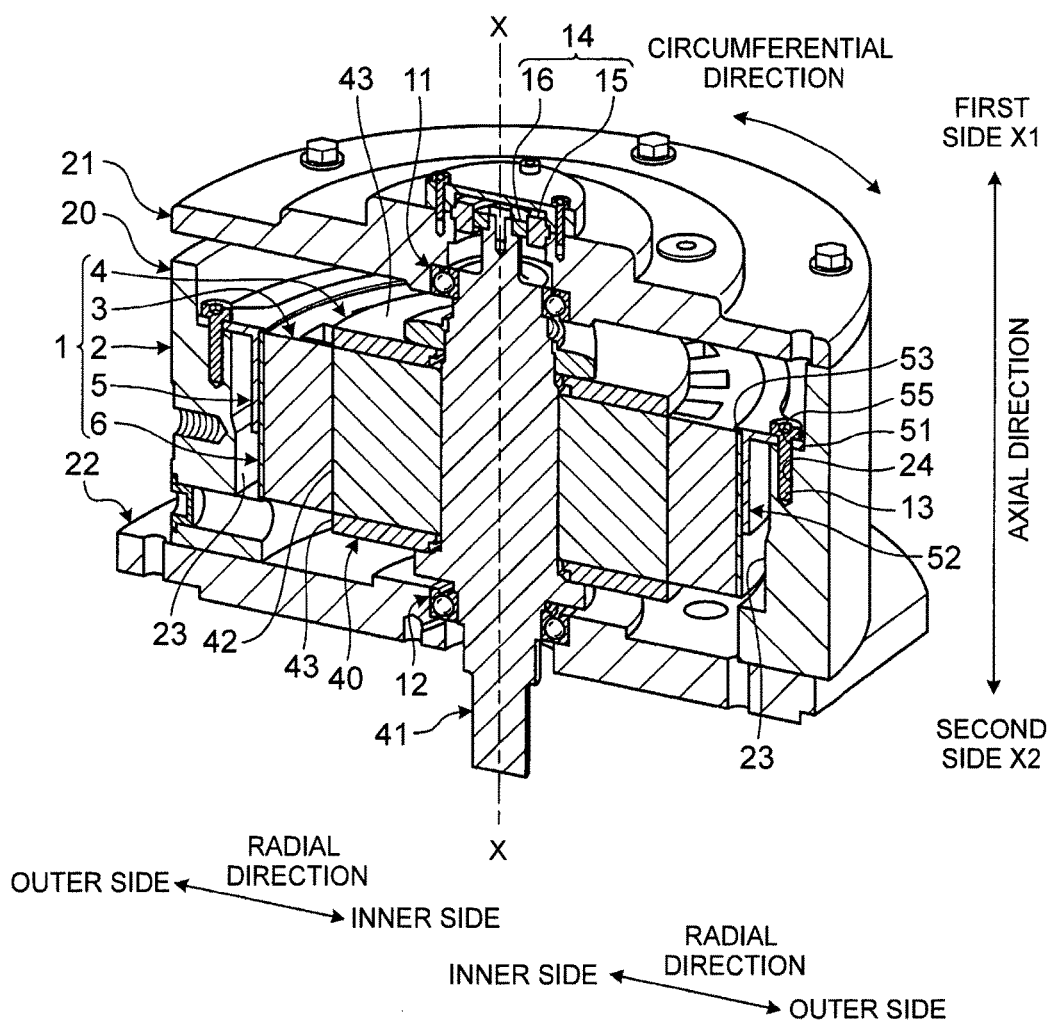
FIG. 1 is a sectional view of a switched reluctance motor according to an embodiment of the invention.
Figure 2:
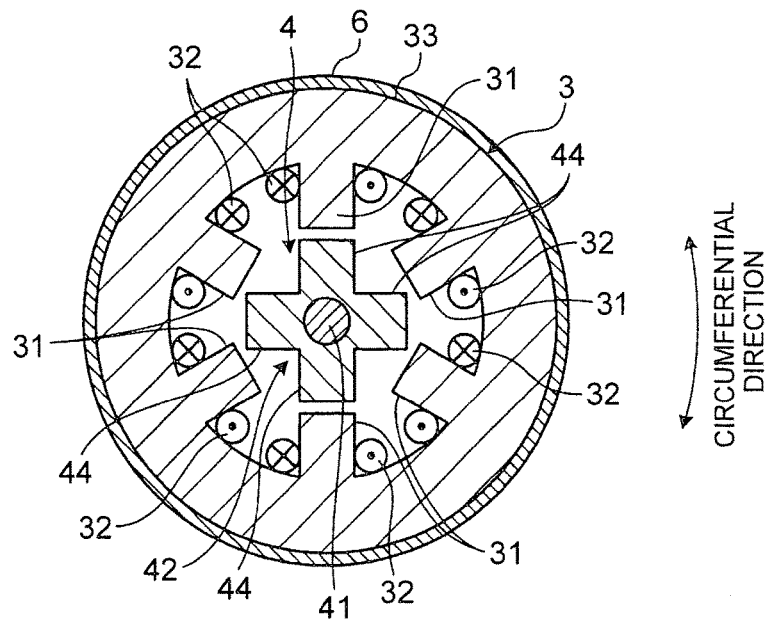
FIG. 2 is a sectional view illustrating an example of the configuration of a stator and a rotor.
Figure 3:
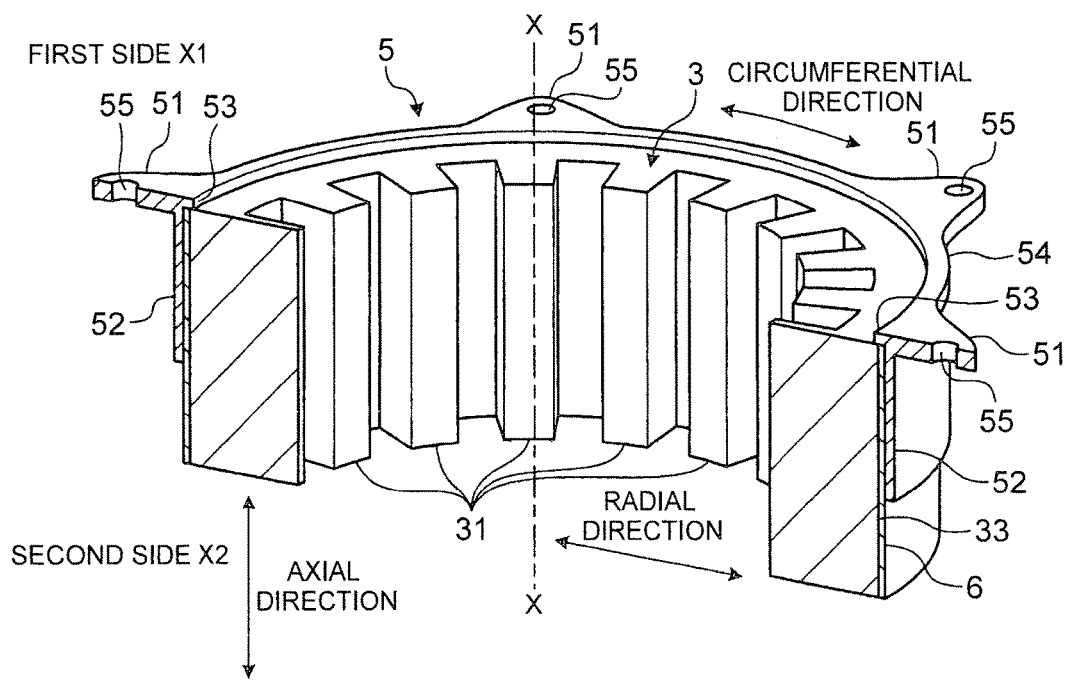
FIG. 3 is a perspective view of the stator, a deformation inhibiting member, and a holding member according to the embodiment.
Figure 4:
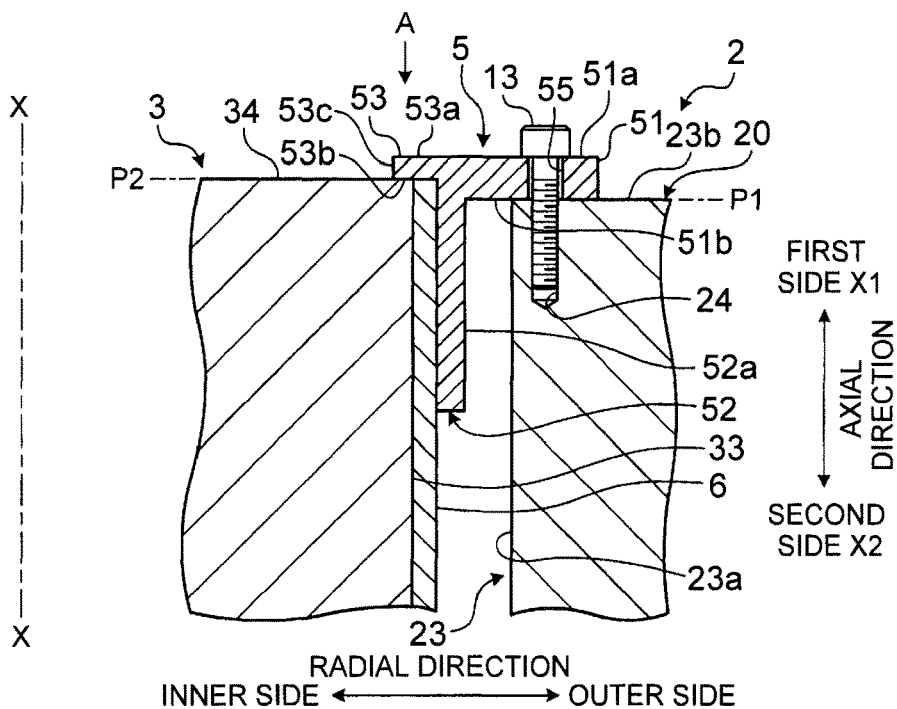
FIG. 4 is a sectional view of a main portion of the switched reluctance motor according to the embodiment.
Figure 5:
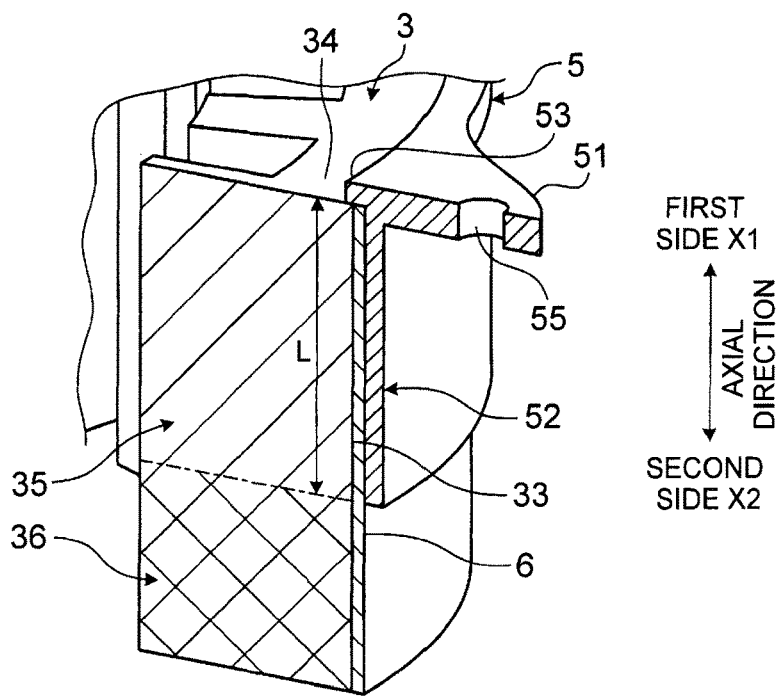
FIG. 5 is a perspective view of the main portion of the switched reluctance motor according to the embodiment.

The embodiment of the invention will be described with reference to FIG. 1 to FIG. 5 The embodiment relates to a switched reluctance motor. FIG. 1 is a sectional view of the switched reluctance motor according to the embodiment of the invention. FIG. 2 is a sectional view illustrating an example of the configuration of a stator and a rotor. FIG. 3 is a perspective view of the stator, a deformation inhibiting member, and a holding member according to the embodiment. FIG. 4 is a sectional view of a main portion of the switched reluctance motor according to the embodiment. FIG. 5 is a perspective view of the main portion of the switched reluctance motor according to the embodiment.

FIG. 1 is a sectional view of the switched reluctance motor according to the embodiment, which is taken along a plane extending along the axial direction of the switched reluctance motor. A switched reluctance motor 1 (hereinafter, simply referred to as "SR motor 1") is mounted in a vehicle, for example, as a power source of the vehicle. The torque output from the SR motor 1 is transmitted to drive wheels of the vehicle, thereby generating driving force for moving the vehicle. The SR motor 1 includes a case 2, a stator 3, a rotor 4, a holding member 5, and a deformation inhibiting member 6. The stator 3 is accommodated in the case 2. The case 2 in the embodiment has a tubular shape. For example, the case 2 has a bottomed cylindrical shape. The case 2 includes a case body 20, a first lid member 21, and a second lid member 22. The case body 20 has a generally-cylindrical shape, and both axial ends of the case body 20 are open. In the present specification, "axial direction" indicates a direction along a central axis X of the stator 3, "radial direction" indicates a direction perpendicular to the central axis X of the stator 3, and "circumferential direction" indicates a rotational direction about the central axis X of the stator 3, which serves as the center of rotation, unless otherwise stated.

One side of the SR motor 1 in the axial direction will be referred to as "first side X1", and the other side of the SR motor 1 in the axial direction will be referred to as "second side X2". The first side X1 and the second side X2 are opposite sides of the SR motor 1 in the axial direction. In FIG. 1, one side of the SR motor 1, on which the first lid member 21 is located, is the first side X1, and the other side of the SR motor 1, on which the second lid member 22 is located, is the second side X2. The first lid member 21 closes one end portion of the case body 20, the one end portion being located on the first side X1. The second lid member 22 closes the other end portion of the case body 20, the other end portion being located on the second side X2. The first lid member 21 and the second lid member 22 each have a disk shape.

The stator 3 is disposed in the case 2. The stator 3 is a cylindrical member, and is disposed coaxially with the case body 20 of the case 2. For example, the stator 3 is formed of a plurality of magnetic steel sheets laminated in the axial direction. As will be described later, the stator 3 is supported by the case body 20 via the holding member 5. The rotor 4 is disposed radially inward of the stator 3, and is rotatably supported by the case 2. The rotor 4 is disposed coaxially with the stator 3. The rotor 4 includes a rotor body 40 and a rotor shaft 41.

The rotor body 40 has a cylindrical shape. The rotor shaft 41 is rotatably supported by the case 2 via a first bearing 11 and a second bearing 12. The first bearing 11 is disposed in the first lid member 21. The first bearing 11 supports a portion of the rotor shaft 41, the portion being located on the first side X1, at a position outside the rotor body 40. The second bearing 12 is disposed in the second lid member 22. The second bearing 12 supports a portion of the rotor shaft 41, the portion being located on the second side X2, at a position outside the rotor body 40.

The rotor body 40 includes a rotor core 42 and a pair of end plates 43. For example, the rotor core 42 is formed of a plurality of magnetic steel sheets laminated in the axial direction. The end plates 43 are respectively disposed at opposite axial ends of the rotor core 42. The rotor core 42 is held between the end plates 43. The rotor core 42 is fixed to the rotor shaft 41. The rotor core 42 and the stator 3 face each other in the radial direction. FIG. 2 is a sectional view of the stator 3 and the rotor 4 taken along a plane perpendicular to the axial direction. As illustrated in FIG. 2, the stator 3 has a plurality of salient poles 31. The salient poles 31 project from the inner peripheral surface of the stator 3 inward in the radial direction. The salient poles 31 are disposed at regular intervals in the circumferential direction. The salient poles 31 have, for example, a rectangular shape as viewed from the axial direction. Each salient pole 31 is provided with a stator coil 32, which is a winding wire.

The rotor core 42 has a plurality of salient poles 44. The salient poles 44 project from the outer peripheral surface of the rotor core 42 outward in the radial direction. The salient poles 44 are disposed at regular intervals in the circumferential direction. The salient poles 44 have, for example, a rectangular shape as viewed from the axial direction. When one salient pole 31 and one salient pole 44 face each other, there is a small gap between the salient pole 31 and the salient pole 44.

When the stator coil 32 of one salient pole 31 of the stator 3 is energized, an attraction force is generated between the salient pole 31 and the salient pole 44 of the rotor core 42 due to a magnetic flux generated between the salient pole 31 and the salient pole 44. A circumferential component of the attraction force serves as a rotational force for rotating the rotor core 42. The SR motor 1 includes a control circuit that controls the timing of energization of each stator coil 32 and the amount of electricity to be supplied to each stator coil 32.

The control circuit switches, as appropriate, the stator coils 32 to be energized based on the rotational position of the rotor 4, thereby rotating the rotor 4.

A radial component of the attraction force generated due to energization of the stator coil 32 causes the salient pole 31 of the stator 3 to be attracted inward in the radial direction, thereby deforming the stator 3. In conventional switched reluctance motors, vibrations and noise are undesirably generated by deformation of the stator 3, which is caused by alternately energizing and de-energizing each stator coil 32.

The SR motor 1 according to the present embodiment includes the deformation inhibiting member 6 that inhibits deformation of the stator 3. As illustrated in FIG. 1 and FIG. 2, the deformation inhibiting member 6 is fitted to the outer peripheral surface of the stator 3. The deformation inhibiting member 6 has such a shape as to conform to the outer peripheral surface of the stator 3. In the present embodiment, the deformation inhibiting member 6 has a cylindrical shape. The deformation inhibiting member 6 may cover the entirety of the outer peripheral surface of the stator 3. The deformation inhibiting member 6 in the present embodiment is provided so as to extend from one axial end of the stator 3 to the other axial end of the stator 3 as illustrated in FIG. 1. The deformation inhibiting member 6 is fitted to the outer peripheral surface of the stator 3 by, for example, press-fitting. The inner peripheral surface of the deformation inhibiting member 6 may be bonded to the outer peripheral surface of the stator 3.

The deformation inhibiting member 6 has stiffness higher than that of the stator 3. For example, the deformation inhibiting member 6 has a Young's modulus higher than that of the stator 3. From the viewpoint of inhibiting deformation of the stator 3, for example, the Young's modulus of the deformation inhibiting member 6 in the circumferential direction is made higher than the Young's modulus of the stator 3 in the circumferential direction. The deformation inhibiting member 6 inhibits deformation of the stator 3 due to the attraction force between the salient pole 31 and the salient pole 44. For example, when a portion of the stator 3 is deformed inward in the radial direction due to the attraction force acting on the salient pole 31, the deformation inhibiting member 6 is deformed in accordance with the deformation of the stator 3. When the attraction force stops acting on the salient pole 31 and thus the portion of the stator 3, which has been deformed inward in the radial direction, attempts to restore its original shape, the deformation inhibiting member 6 moderates the speed of restoration. Further, when the portion of the stator 3, which has been deformed inward in the radial direction, attempts to deform outward in the radial direction beyond its original shape, the deformation inhibiting member 6 inhibits such a deformation. The deformation inhibiting member 6 inhibits deformation of the stator 3 as described above, thereby inhibiting the stator 3 from generating vibrations and noise. In the present specification, vibrations and noise will be simply referred to as "vibrations and the like", where appropriate.

In the present embodiment, the linear expansion coefficient of the deformation inhibiting member 6 with respect to a temperature change takes a negative value. That is, the deformation inhibiting member 6 has such a deformation characteristic that the deformation inhibiting member 6 contracts with an increase in temperature. On the other hand, the linear expansion coefficient of the stator 3 with respect to a temperature change takes a positive value. That is, the stator 3 has such a deformation characteristic that the stator 3 expands with an increase in temperature. Thus, as the temperature of the stator 3 and the temperature of the deformation inhibiting member 6 increase, the deformation inhibiting member 6 deforms so as to fasten the stator 3. As the temperature of the stator 3 and the temperature of the deformation inhibiting member 6 increase, a reaction force of the deformation inhibiting member 6 against the deformation of the stator 3, which attempts to expand outward in the radial direction, increases. As a result, the deformation of the stator 3 is inhibited.

The deformation inhibiting member 6 may be lightweight and have high stiffness. For example, carbon fiber reinforced plastic (CFRP) may be employed as a material of the deformation inhibiting member 6. However, the material of the deformation inhibiting member 6 is not limited to CFRP, and a material having a Young's modulus higher than that of the stator 3, or a material having a linear expansion coefficient that takes a negative value may be used as needed.

The temperature of the stator 3 increases typically during a high-load operation in which the SR motor 1 is operating under high load. The vibrations and the like generated by the stator 3 tend to increase typically during the high-load operation of the SR motor 1. Thus, the deformation inhibiting member 6 in the present embodiment effectively inhibits deformation of the stator 3, thereby reducing generation of the vibrations and the like during the high-load operation.

In the SR motor 1 according to the present embodiment, the stator 3 is held by the case 2 via the holding member 5, as will be described below. The holding member 5 in the present embodiment inhibits transmission of the vibrations and the like generated by the stator 3, to the case 2. Thus, with the SR motor 1 according to the present embodiment, transmission of the vibrations and the like generated by the stator 3 toward a vehicle body is inhibited. As illustrated in FIG. 1, the holding member 5 is fixed to the case 2, and holds the stator 3 such that the stator 3 is spaced apart from the inner peripheral surface of the case 2. The case body 20 has a supporting portion 23. The supporting portion 23 is a radially-inner portion of the case body 20. The supporting portion 23 projects inward in the radial direction. The supporting portion 23 is disposed at such a position as to face the stator 3 in the radial direction. The supporting portion 23 in the present embodiment has a cylindrical shape. The axial width of the supporting portion 23 corresponds to the axial width of the stator 3. Bolt holes 24 are provided in the supporting portion 23. The bolt holes 24 extend in a direction toward the second side X2 from an end surface of the supporting portion 23, the end surface being located on the first side X1.

The holding member 5 includes fixed portions 51, a holding portion 52, and a contact portion 53. The holding member 5 is made of, for example, metal. The fixed portions 51 are fixed to the case 2. In the present embodiment, the fixed portions 51 are fastened to the supporting portion 23 of the case 2 with bolts 13. The holding portion 52 is connected to the fixed portions 51, and holds the stator 3 from the outside in the radial direction. The fixed portions 51 extend from the holding portion 52 outward in the radial direction. The contact portion 53 is connected to the fixed portions 51, and sets the axial position of the stator 3 by making contact with an axial end surface of the stator 3.

The holding portion 52 has a cylindrical shape. An end portion of the holding portion 52 on the first side X1 is connected to the fixed portions 51 and the contact portion 53. That is, the fixed portions 51, the holding portion 52, and the contact portion 53 are connected to each other. As illustrated in FIG. 3, the fixed portions 51 project from the holding portion 52 outward in the radial direction. Each fixed portion 51 is tapered such that the width of the fixed portion 51 in the circumferential direction decreases toward the radially outside. Each fixed portion 51 has a through-hole 55. The through-hole 55 extends through the fixed portion 51. The bolts 13 inserted through the through-holes 55 are screwed into the bolt holes 24 of the case body 20, so that the fixed portions 51 are fixed to the case body 20.

The holding member 5 has a plurality of the fixed portions 51. The fixed portions 51 are disposed at intervals along the circumferential direction. For example, the fixed portions 51 are disposed at regular intervals. The holding member 5 has a flange portion 54. The flange portion 54 projects from the holding portion 52 outward in the radial direction. The flange portion 54 connects proximal end portions of the adjacent fixed portions 51 to each other. The contact portion 53 projects from the holding portion 52 inward in the radial direction. The contact portion 53 in the present embodiment has an annular shape.

FIG. 4 is a sectional view of a main portion of the SR motor 1 taken along a plane including the central axis X of the stator 3. As illustrated in FIG. 4, the deformation inhibiting member 6 is disposed between the holding portion 52 and the stator 3 in the radial direction, and is held between the holding portion 52 and the stator 3. That is, the holding portion 52 holds an outer peripheral surface 33 of the stator 3 via the deformation inhibiting member 6. The holding portion 52 is opposed to the outer peripheral surface 33 of the stator 3 with the deformation inhibiting member 6 interposed between the holding portion 52 and the stator 3 in the radial direction. The holding portion 52 is fitted to the outer peripheral surface of the deformation inhibiting member 6 by, for example, press-fitting. That is, in the SR motor 1 according to the present embodiment, the deformation inhibiting member 6 is fitted to the outer peripheral surface 33 of the stator 3, and the holding portion 52 is fitted to the outer peripheral surface of the deformation inhibiting member 6. The stator 3 and the deformation inhibiting member 6 may be bonded to each other, and the deformation inhibiting member 6 and the holding portion 52 may be bonded to each other. The holding portion 52 covers the deformation inhibiting member 6 from the radially outside. The holding portion 52 is fixed to the deformation inhibiting member 6 so as to be immovable relative to the deformation inhibiting member 6. The deformation inhibiting member 6 covers the stator 3 from the radially outside. The deformation inhibiting member 6 is fixed to the stator 3 so as to be immovable relative to the stator 3.

The holding portion 52 is spaced apart from an inner peripheral surface 23a of the supporting portion 23 of the case body 20. That is, there is a gap between an outer peripheral surface 52a of the holding portion 52 and the inner peripheral surface 23a of the supporting portion 23. Thus, even when vibrations and the like generated by the stator 3 are transmitted to the holding portion 52 through the deformation inhibiting member 6, the vibrations and the like are not transmitted directly to the case body 20 from the holding portion 52. Because there is a space between the holding portion 52 and the case body 20 in the radial direction, the vibrations and the like that are transmitted to the case body 20 are reduced. Because there is the space between the holding portion 52 and the case body 20, deformation of the case body 20 is inhibited. For example, if the outer peripheral surface 33 of the stator 3 is in contact with the inner peripheral surface 23a of the case body 20, the case body 20 deforms in accordance with the deformation of the stator 3, so that the vibrations and the like may be transmitted to the case body 20. In contrast to this, in the SR motor 1 according to the present embodiment, the outer peripheral surface 52a of the holding portion 52 and the inner peripheral surface 23a of the case body 20 are not in contact with each other, so that deformation of the case body 20 is inhibited.

In the SR motor 1 according to the present embodiment, the vibrations and the like generated by the stator 3 are transmitted to the holding portion 52 through the deformation inhibiting member 6. The vibrations and the like transmitted to the holding portion 52 are transmitted to the case body 20 through the fixed portions 51. The vibrations and the like are attenuated while the vibrations and the like are being transmitted to the case body 20 from the stator 3 through the several members.

In the SR motor 1 according to the present embodiment, a portion of the outer peripheral surface 33 of the stator 3, the portion being located on the first side X1, is held from the radially outside by the holding portion 52, whereas the other portion of the outer peripheral surface 33 of the stator 3 is not held by the holding portion 52. As illustrated in FIG. 5, a held portion 35 of the stator 3, the held portion being located on the first side X1, is held from the radially outside by the holding portion 52. On the other hand, a portion 36 of the stator 3 other than the held portion 35 is not held from the radially outside by the holding portion 52. Providing the portion 36 that is not held by the holding portion 52 makes it possible to inhibit the vibrations and the like generated by the stator 3 from being transmitted to the case body 20. The end portion of the stator 3 on the first side X1 is supported by the case body 20 via the holding member 5. The other end portion of the stator 3 on the second side X2 is a free end. In other words, it can be said that the stator 3 is supported in a cantilever manner. Thus, the vibrations of the end portion of the stator 3 on the first side X1, which is a fixed end, are reduced.

In the stator 3, an axial length L of the held portion 35 held by the holding portion 52 is preferably short. The axial length L is set such that the movements of the stator 3 relative to the case body 20 in the circumferential direction and the axial direction are restricted by the holding portion 52. That is, the axial length L of the held portion 35 is set to a value within a range of lengths at which the movement of the stator 3 relative to the case body 20 is restricted by a tightening force or an adhesive force between the holding portion 52 and the deformation inhibiting member 6. The axial length L of the held portion 35 is set to a minimal length in view of the mass of the stator 3 and a torque reaction force during driving of the SR motor 1. The axial length L of the held portion 35 may be, for example, about half the axial length of the stator 3 or a length slightly longer than half the axial length of the stator 3.

Referring again to FIG. 4, each fixed portion 51 is a part in the form of a flat plate. A surface 51b of the fixed portion 51, the surface 51b being located on the holding portion 52 side (hereinafter, referred to as "back side 51b"), is in contact with an end surface 23b of the supporting portion 23 on the first side X1 (hereinafter, referred to as "supporting surface"). The supporting surface 23b is a surface perpendicular to the axial direction. The fixed portion 51 is fastened to the supporting portion 23 with the bolt 13, with the back side 51b in contact with the supporting surface 23b. The bolt 13 is inserted into the through-hole 55 from a surface 51a which is on the opposite side of the fixed portion 51 from the holding portion 52 (hereinafter, referred to as "front side 51a"). Then, the bolt 13 is screwed into the bolt hole 24. Thus, the fixed portion 51 is held between the head of the bolt 13 and the supporting surface 23b, so that the fixed portion 51 is fixed to the supporting portion 23. In other words, the fixed portion 51 is fixed to the case 2 while being supported by the supporting surface 23b. The supporting surface 23b and the bolt hole 24 are positioning portions that set a fixed position of the fixed portion 51 relative to the case 2. The supporting surface 23b functions as a positioning portion that sets an axial position P1 of the holding member 5. The bolt 13 and the bolt hole 24 function as a positioning portion that sets a position of the fixed portion 51 in each of the circumferential direction and the radial direction.

The holding portion 52 is perpendicular to the fixed portion 51, as illustrated in a section in FIG. 4. For example, the thickness of the holding portion 52 may be smaller than the thickness of the fixed portion 51, as illustrated in FIG. 4. The thickness of the holding portion 52 in the present embodiment is equal to the thickness of the deformation inhibiting member 6.

The fixed portions 51 and the holding portion 52 function as a radial positioning portion that sets a radial position of the stator 3. When the fixed portions 51 are fixed to the case 2 with the bolts 13, the radial position of the holding member 5 is set. The holding portion 52 of the holding member 5 is fixed so as to be coaxial with the case body 20. Thus, the fixed portion 51 and the holding portion 52 hold the stator 3 such that the stator 3 and the case body 20 are coaxial with each other.

The contact portion 53 is connected to the radially inner side of each fixed portion 51. The contact portion 53 is a part in the form of a flat plate. A front side 53a of the contact portion 53, that is, a surface on the opposite side of the contact portion 53 from the holding portion 52, is flush with the front side 51a of the fixed portion 51. The thickness of the contact portion 53 is smaller than the thickness of the fixed portion 51. A back side 53b of the contact portion 53, that is, a surface of the contact portion 53 on the holding portion 52 side, is offset toward the first side X1 from the back side 51b of the fixed portion 51. The back side 53b of the contact portion 53 functions as a positioning portion that sets an axial position P2 of the stator 3. The axial position P2 of the stator 3 is an axial position of an end surface 34 of the stator 3, the end surface 34 being located on the first side X1 (hereinafter, referred to simply as "first end surface 34"). Note that the axial position P2 of the stator 3 is a position of the stator 3 relative to the case body 20.

The contact portion 53 projects inward in the radial direction beyond the deformation inhibiting member 6. An inner peripheral surface 53c of the contact portion 53 is located radially inward of the outer peripheral surface 33 of the stator 3. That is, at least a part of the contact portion 53, the part being located on the inner peripheral surface 53c side, faces the stator 3 in the axial direction. The contact portion 53 overlaps with the first end surface 34 of the stator 3 as viewed from the axial direction (see an arrow A in FIG. 4). The holding member 5 is fitted to the deformation inhibiting member 6 such that the first end surface 34 of the stator 3 is in contact with the back side 53b of the contact portion 53. Thus, the position of the stator 3 relative to the case body 20 in the axial direction is set by the holding member 5. In the present embodiment, the stator 3 is disposed such that the first end surface 34 of the stator 3 is offset toward the first side X1 from the supporting surface 23b of the case body 20.

As described above, the SR motor 1 according to the present embodiment includes the holding member 5 that is fixed to the case 2, and that holds the stator 3 with the stator 3 spaced apart from the inner peripheral surface of the case 2. The holding member 5 includes: the holding portion 52 that holds the stator 3 from the radially outside, the fixed portions 51 that project from the holding portion 52 outward in the radial direction, and that are fixed to the supporting portion 23 of the case 2; and the contact portion 53 that is connected to the fixed portions 51, and that sets the axial position of the stator 3 by coming into contact with the axial end surface of the stator 3. The holding portion 52 is spaced apart from the inner peripheral surface 23*a* of the case 2.

When the stator 3 is held by the holding member 5 while being spaced apart from the inner peripheral surface 23*a* of the case 2, a path through which the vibrations and the like are transmitted in the radial direction between the stator 3 and the inner peripheral surface 23*a* of the case 2 is cut off. Because there is the space between the stator 3 and the inner peripheral surface 23*a* of the case 2, a path through which the vibrations and the like are transmitted between the outer peripheral surface 33 of the stator 3 and the inner peripheral surface 23*a* of the case 2 is cut off. Thus, with the SR motor 1 according to the present embodiment, the vibrations and the like that are transmitted from the stator 3 to the case 2 are reduced.

In the SR motor 1 according to the present embodiment, an area in which the vibrations and the like are transmitted between the stator 3 and the case 2 is small because the holding portion 52 is spaced apart from the inner peripheral surface 23*a* of the case 2. For example, the area in which the vibrations and the like are transmitted in the radial direction is smaller than that in a case where the outer peripheral surface 52*a* of the holding portion 52 and the inner peripheral surface 23*a* of the case 2 are in contact with each other. As a result, transmission of the vibrations and the like is inhibited. In the SR motor 1 according to the present embodiment, the area in which the vibrations and the like are transmitted between the stator 3 and the case 2 is an area of contact between the fixed portions 51 and the supporting surface 23*b* of the supporting portion 23. In the holding member 5, the fixed portions 51 are disposed at intervals in the circumferential direction. That is, only part of the holding member 5 in the circumferential direction is in contact with the case 2. Thus, the area of contact between the holding member 5 and the case 2 is considerably smaller than the area of the outer peripheral surface 33 of the stator 3. Thus, the vibrations and the like that are transmitted from the stator 3 to the case 2 are reduced more effectively than in a case where the outer peripheral surface 33 of the stator 3 is in contact with the inner peripheral surface 23*a* of the case 2, such as a case where the stator 3 is press-fitted in the case 2.

Further, in the SR motor 1 according to the present embodiment, an area of contact between the stator 3 and the holding member 5 is made small to reduce the vibrations that are transmitted from the stator 3 to the holding member 5. The area of a portion of the stator 3 covered with the holding portion 52 from the radially outside is an area of a portion of the outer peripheral surface 33, which corresponds to the held portion 35. The area is smaller than the entire area of the outer peripheral surface 33. Thus, transmission of vibrations and the like generated by the stator 3 to the holding member 5 is inhibited more effectively than in a case where the holding portion 52 covers the entire outer peripheral surface 33 of the stator 3. Note that the holding portion 52 may hold the entire surface of the stator 3 as necessary, in order to hold the stator 3 to restrict the movement of the stator 3 relative to the case 2. In this case, the axial length L of the held portion 35 of the stator 3 is equal to the axial length of the stator 3.

In the SR motor 1 according to the present embodiment, the axial position of the stator 3 with respect to the case 2 is set by the holding member 5. Thus, a decrease in alignment accuracy of a resolver is inhibited as described below. As illustrated in FIG. 1, the SR motor 1 is provided with a resolver 14. The resolver 14 detects a rotational position of the rotor 4. The resolver 14 includes a resolver stator 15 and a resolver rotor 16. The resolver stator 15 is disposed in the first lid member 21. The resolver rotor 16 is disposed on the rotor shaft 41, and rotates together with the rotor shaft 41. The resolver rotor 16 is connected to an end portion of the rotor shaft 41, the end portion being located on the first side X 1. The resolver stator 15 and the resolver rotor 16 are disposed so as to face each other in the radial direction. The resolver stator 15 outputs an electric signal corresponding to the rotational position of the resolver rotor 16. For example, an electronic control unit (ECU) that controls the SR motor 1 acquires the rotational position of the rotor 4 based on the output signal from the resolver stator 15.

An axial displacement of the relative position between the resolver stator 15 and the resolver rotor 16 (hereinafter, referred to simply as "displacement of the resolver 14") affects the detection accuracy of the resolver 14. For example, the axial displacement of the stator 3 relative to the case 2 may be a cause of the displacement of the resolver 14. If the position of the stator 3 relative to the case 2 is displaced in the axial direction from a prescribed position during assembly of the SR motor 1, displacement of other components is caused, possibly resulting in displacement of the resolver 14. For example, the axial displacement of the stator 3 leads to displacement of the rotor 4, possibly resulting in the axial displacement of the resolver rotor 16 relative to the resolver stator 15.

In contrast to this, in the SR motor 1 according to the present embodiment, the position of the stator 3 relative to the case 2 in the axial direction is set by the holding member 5. The axial position P1 of the holding member 5 relative to the case 2 is set by the supporting surface 23*b* of the case 2, and the axial position P2 of the stator 3 relative to the holding member 5 is set by the back side 53*b* of the contact portion 53. Thus, with the SR motor 1 according to the present embodiment, the axial displacement of the stator 3 relative to the case 2 is inhibited. As a result, displacement of the resolver 14 is inhibited.

The contact portion 53 in the present embodiment projects inward in the radial direction beyond the deformation inhibiting member 6, and is thus in direct contact with the first end surface 34 of the stator 3. Thus, the positioning of the stator 3 is performed with a higher degree of accuracy than in a case where the contact portion 53 makes contact with the deformation inhibiting member 6 to indirectly set the axial position of the stator 3.

The contact portion 53 in the present embodiment also has a function of restricting the axial movement of the stator 3 during an operation of the SR motor 1. The rotor shaft 41 may be provided with an output gear that transmits the torque generated by the SR motor 1. When the output gear is a helical gear, the output gear receives an axial reaction force when outputting the torque generated by the SR motor 1. When the rotor 4 is axially moved by the reaction force, the stator 3 also receives an axial force due to the attraction force between the salient pole 31 and the salient pole 44.

The direction of a helix angle of the output gear provided on the rotor shaft 41 may be such a direction that the output gear receives a reaction force in a direction toward the first side X1. For example, when the SR motor 1 is mounted in a vehicle as a power source of the vehicle, the direction of the helix angle of the output gear may be such a direction that the output gear receives a reaction force in a direction toward the first side X1 when the SR motor 1 outputs the torque for moving the vehicle forward. In this way, even if the stator 3 is attracted in the axial direction when the SR motor 1 moves the vehicle forward, the movement of the stator 3 is restricted by the contact portion 53 of the holding member 5.

Figure 6:
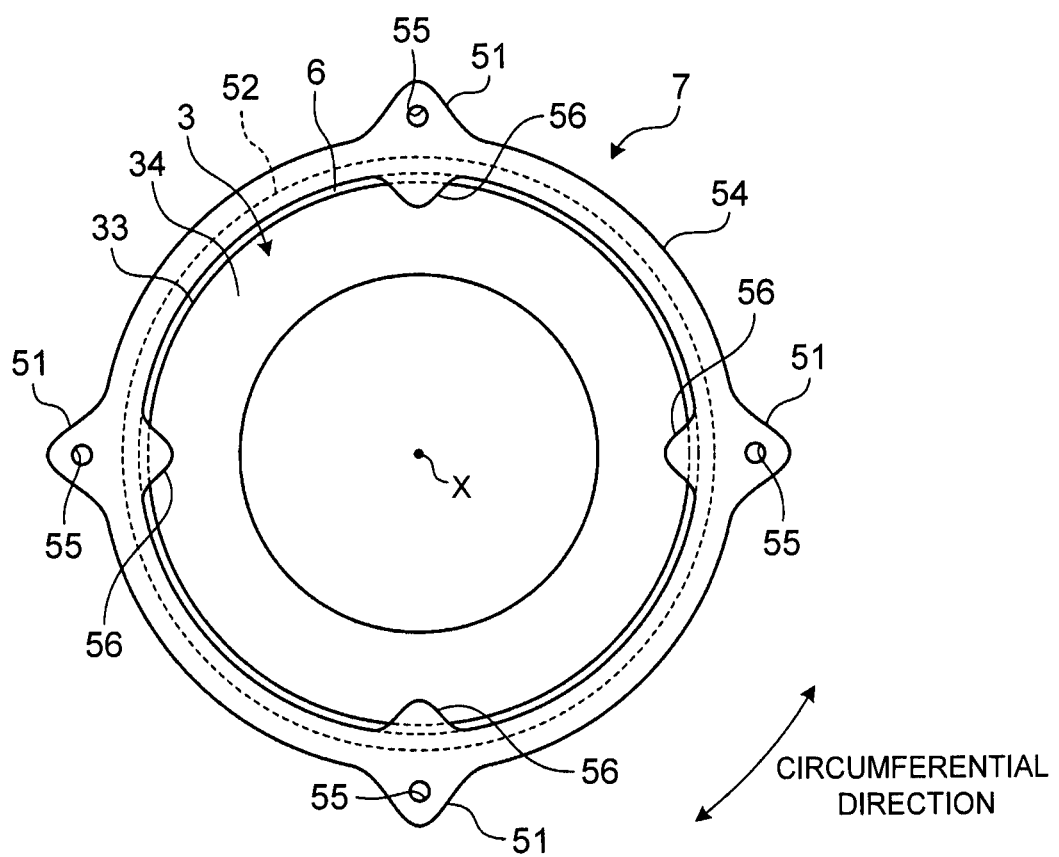
FIG. 6 is a plan view of a holding member according to a first modified example of the embodiment.

A first modified example of the foregoing embodiment will be described below. FIG. 6 is a plan view illustrating a holding member according to the first modified example of the foregoing embodiment. FIG. 6 illustrates the stator 3 and a holding member 7 as viewed from the axial direction toward the second side X2. In the foregoing embodiment, the contact portion 53 is in contact with the first end surface 34 of the stator 3 over the entire circumference. However, the holding member just needs to be in contact with at least part of the first end surface 34 in the circumferential direction. That is, the contact portion just needs to be appropriately disposed so as to set the axial position of the stator 3 by making contact with the first end surface 34. Contact portions 56 in the first modified example are in contact with part of the first end surface 34 in the circumferential direction.

As illustrated in FIG. 6, the holding member 7 includes the fixed portions 51, the holding portion 52, and the contact portions 56. The fixed portions 51 and the holding portion 52 of the holding member 7 are the same as, for example, the fixed portions 51 and the holding portion 52 of the holding member 5 in the foregoing embodiment. The fixed portions 51 have through-holes 55. The holding member 7 has a plurality of the contact portions 56. The contact portions 56 are connected to the fixed portions 51, and project from the holding portion 52 inward in the radial direction. The contact portions 56 project inward in the radial direction beyond the inner peripheral surface of the deformation inhibiting member 6. Thus, the contact portions 56 face the first end surface 34 of the stator 3 in the axial direction. The contact portions 56 function as an axial positioning portion that sets the axial position of the stator 3 by making contact with the first end surface 34. In the first modified example, the contact portions 56 are disposed at the same positions as the fixed portions 51 in the circumferential direction. That is, the contact portions 56 and the fixed portions 51 are disposed adjacent to each other in the radial direction. However, the positions of the contact portions 56 in the circumferential direction are not limited the above-described positions.

Each contact portion 56 may have any shape. For example, each contact portion 56 may be tapered such that the width of the contact portion 56 in the circumferential direction is decreased toward the radially inside. When the position of the stator 3 is set by a plurality of the contact portions 56, the number of the contact portions 56 may be three or more. Each contact portion 56 may be spaced apart from the adjacent contact portions 56 in the circumferential direction in a balanced manner.

A second modified example of the foregoing embodiment will be described below. In the foregoing embodiment, the deformation inhibiting member 6 is fitted to the outer peripheral surface 33 of the stator 3. However, the SR motor 1 need not include the deformation inhibiting member 6. For example, the holding portion 52 in the foregoing embodiment may be directly fitted to the outer peripheral surface 33 of the stator 3 to hold the stator 3 without disposing the deformation inhibiting member 6 between the holding portion 52 and the outer peripheral surface 33.

The holding portion 52 may also serve as a deformation inhibiting member. For example, when the Young's modulus of the holding portion 52 in the circumferential direction is higher than that of the stator 3 in the circumferential direction, the holding portion 52 functions as a deformation inhibiting member that inhibits deformation of the stator 3.

An absorbing member that absorbs vibrations and the like may be disposed in addition to, or instead of the deformation inhibiting member 6. For example, an absorbing member may be disposed between the outer peripheral surface 33 of the stator 3 and the holding portion 52, instead of the deformation inhibiting member 6. For example, resin such as rubber may be employed as a material of the absorbing member. The absorbing member inhibits transmission of vibrations and the like between the stator 3 and the holding portion 52.

A third modified example of the foregoing embodiment will be described below. In the foregoing embodiment, the holding member 5 holds a portion of the stator 3, the portion being located on the resolver 14 side. Alternatively, the holding member 5 may hold a portion on the opposite side of the stator 3 from the resolver 14, that is, a portion of the stator 3, the portion being located on the second side X2. In this case, the holding member 5 may be fixed to the case 2 at a position near the end portion of the stator 3 on the second side X2.

The switched reluctance motor may further include a deformation inhibiting member that is fitted to the outer peripheral surface of the stator and that inhibits deformation of the stator. The Young's modulus of the deformation inhibiting member in the circumferential direction of the stator may be higher than the Young's modulus of the stator in the circumferential direction.

In the switched reluctance motor, the linear expansion coefficient of the deformation inhibiting member with respect to a temperature change may be a negative value, and the deformation inhibiting member may contract with an increase in temperature.

In the switched reluctance motor, the deformation inhibiting member may be held between the holding portion and the stator in the radial direction, and the contact portion may project inward in the radial direction beyond the deformation inhibiting member, and the deformation inhibiting member may overlap with the axial end surface of the stator as viewed from the axial direction.

In the switched reluctance motor, the supporting portion may have a supporting surface perpendicular to the axial direction, and the fixed portion may be fixed to the case while being supported by the supporting surface.

The switched reluctance motor further includes a resolver that detects a rotational position of the rotor, a resolver rotor of the resolver may be disposed on the rotor shaft of the rotor, and a resolver stator of the resolver may be disposed in the case.

The technical features described in the foregoing embodiment and the modified examples may be combined with each other as needed.

What is claimed is:

1. A switched reluctance motor comprising:
   a stator;
   a case in which the stator is accommodated;
   a rotor disposed inward of the stator in a radial direction of the switched reluctance motor;
   a holding member fixed to the case, the holding member being configured to hold the stator with the stator spaced apart from an inner peripheral surface of the case; and a deformation inhibiting member fitted to an outer peripheral surface of the stator and configured to inhibit deformation of the stator,
the holding member including:
   a holding portion configured to hold the stator from an outside in the radial direction, the holding portion being spaced apart from the inner peripheral surface of the case,
   a fixed portion fixed to the case, and
   a contact portion being in contact with an axial end surface of the stator,
the deformation inhibiting member being disposed between the holding portion and the stator in the radial direction,
the contact portion projecting inward in the radial direction beyond the deformation inhibiting member, and
the contact portion overlapping with the axial end surface of the stator.

2. The switched reluctance motor according to claim 1, wherein
   an area of a portion of the stator, the portion being covered with the holding portion from the outside in the radial direction, is smaller than an area of an entirety of a radially outer peripheral surface of the stator.

3. The switched reluctance motor according to claim 1, wherein
   the holding member includes a plurality of the fixed portions,
   the fixed portions project from the holding portion outward in the radial direction,
   the fixed portions are spaced apart from each other in a circumferential direction of the switched reluctance motor, and
   only part of the holding member in the circumferential direction is in contact with the case.

4. The switched reluctance motor according to claim 1, wherein
   a Young's modulus of the deformation inhibiting member in a circumferential direction of the stator is higher than a Young's modulus of the stator in the circumferential direction of the stator.

5. The switched reluctance motor according to claim 4, wherein
   a linear expansion coefficient of the deformation inhibiting member is a negative value.

6. The switched reluctance motor according to claim 1, wherein
   the case includes a supporting portion,
   the supporting portion has a supporting surface perpendicular to an axial direction of the switched reluctance motor, and
   the fixed portion is supported by the supporting surface.

7. The switched reluctance motor according to claim 1, further comprising
   a resolver configured to detect a rotational position of the rotor, wherein
   the rotor includes a rotor shaft, and
   the resolver includes:
      a resolver rotor disposed on the rotor shaft; and
      a resolver stator disposed in the case.

* * * * *